(12) United States Patent
Cignetti et al.

(10) Patent No.: US 9,525,672 B2
(45) Date of Patent: Dec. 20, 2016

(54) MULTI-FACETED COMPUTE INSTANCE IDENTITY

(71) Applicant: Amazon Technologies, Inc., Reno, NV (US)

(72) Inventors: Todd Lawrence Cignetti, Ashburn, VA (US); Peter Zachary Bowen, Bainbridge Island, WA (US); Andrew Jeffrey Doane, Vienna, VA (US); Alexander Edward Schoof, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 6 days.

(21) Appl. No.: 14/577,232

(22) Filed: Dec. 19, 2014

(65) Prior Publication Data

US 2016/0182473 A1 Jun. 23, 2016

(51) Int. Cl.
*G06F 21/44* (2013.01)
*H04L 29/06* (2006.01)

(52) U.S. Cl.
CPC ............ *H04L 63/061* (2013.01); *G06F 21/44* (2013.01); *H04L 63/0428* (2013.01); *H04L 63/0823* (2013.01)

(58) Field of Classification Search
CPC ............ G06F 17/00; G06F 11/30; G06F 7/04; G06F 15/173; G06F 9/455; G06F 21/00; G06F 17/30; G06F 15/16; H04L 63/08; H04L 9/0897; H04L 9/3234; H04L 9/3271; H04L 63/126; H04L 9/3247; H04L 9/0861; H04L 9/321; H04L 9/3263; H04L 63/061; H04L 63/0823; H04L 67/34; H04W 12/06; H04W 12/10

USPC ....... 713/153, 155–156, 168, 171, 175, 189; 726/1, 6, 12; 709/203, 223, 226, 227; 718/1; 715/583; 455/414.3
See application file for complete search history.

(56) References Cited

U.S. PATENT DOCUMENTS

| 7,802,092 | B1 * | 9/2010 | Kelly ................... H04L 9/0861 713/155 |
| 8,327,434 | B2 | 12/2012 | Bowen |
| 8,341,625 | B2 | 12/2012 | Ferris et al. |
| 8,375,221 | B1 | 2/2013 | Thorn et al. |

(Continued)

FOREIGN PATENT DOCUMENTS

| WO | 2012047088 | 4/2012 |
| WO | 2013101178 | 7/2013 |

OTHER PUBLICATIONS

U.S. Appl. No. 14/535,056, filed Nov. 6, 2014, Nachiketh Rao Potlapally.

(Continued)

*Primary Examiner* — Thanhnga B Truong
(74) *Attorney, Agent, or Firm* — Robert C. Kowert; Meyertons, Hood, Kivlin, Kowert & Goetzel, P.C.

(57) ABSTRACT

A compute instance of a virtual computing service (VCS) is assigned first and second cryptographically verifiable identities (CVIs) within respective namespaces. A cryptographic key pair associated with the first CVI includes a non-transferable private key managed by a secure key store which does not permit the private key to be copied. The VCS enables the instance to use the private key for asserting the CVIs. In response to a first identity query, the instance indicates the first CVI. In response to a second identity query, the instance indicates the second CVI.

20 Claims, 9 Drawing Sheets

(56) References Cited

U.S. PATENT DOCUMENTS

| | | |
|---|---|---|
| 8,495,219 B2 | 7/2013 | Berthaud et al. |
| 8,522,018 B2 | 8/2013 | Molina et al. |
| 8,819,797 B2 | 8/2014 | Cross et al. |
| 9,100,827 B2 * | 8/2015 | Adi .................. H04L 9/3271 |
| 2010/0174811 A1 | 7/2010 | Musiri et al. |
| 2012/0246475 A1 | 9/2012 | Yoo et al. |
| 2013/0198511 A1 | 8/2013 | Yoo et al. |
| 2014/0006776 A1 | 1/2014 | Scott-Nash et al. |
| 2014/0007087 A1 | 1/2014 | Scott-Nash et al. |

OTHER PUBLICATIONS

U.S. Appl. No. 14/188,630, filed Feb. 24, 2014, Nachiketh Rao Potlapally.

U.S. Appl. No. 13/932,828, filed Jul. 1, 2013, Nachiketh Rao Potlapally.

Amazon Web Services, "AWS CloudHSM Getting Started Guide", Nov. 5, 2013, pp. 1-45.

TCG, "TPM Main, Part 1 Design Principles", Mar. 1, 2011, pp. 1-172.

TCG, "TPM Main, Part 2 TPM Structures", Mar. 1, 2011, pp. 1-190.

TCG, "TPM Main, Part 3 Commands", Mar. 1, 2011, pp. 1-328.

"Trousers FAQ", accessed Oct. 3, 2014, pp. 1-9.

U.S. Appl. No. 14/520,048, filed Oct. 21, 2014, Todd Lawrence Cignetti.

"Instance Metadata and User Data", Amazon Elastic Compute Cloud, User Guide for Linux, Jun. 15, 2014, pp. 1-6.

"Class InstanceIdentity", AWS SDK for Java, Jan. 8, 2011, pp. 1-5.

"Java PKI API Programmer's Guide", accessed Sep. 29, 2014, pp. 1-29.

"Overview of Puppet's Architecture", Puppet Labs, accessed Nov. 30, 2014, pp. 1-8.

International Search Report and Written Opinion from PCT/US2015/066875, Date of mailing Mar. 9, 2016, Amazon Technologies, Inc., pp. 1-13.

Ananymous, "Using Multiple SSL Certificates in Apache with One IP Address", Retrieved from URL: https://www.archive.org/web/20140824053158/https://www.digicert.com/ssl-support/apache-multiple-ssl-certificates-using-sni.htm, Nov. 11, 2015, pp. 1-2.

R. Housley, et al., "Internet X.509 Public Key Infrastructure Certificate and CRL Profile", JCT-VC Meeting; MPEG Meeting; Mar. 16-23, 2011, pp. 1-130.

* cited by examiner

MULTI-FACETED COMPUTE INSTANCE IDENTITY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

Virtualized computing services implemented at public data centers may package computing capabilities for client use in the form of "compute instances", with several such compute instances often being hosted on a given hardware server on behalf of one or more service clients. The clients may then run desired sets of applications on the compute instances, often performing administration operations via a web-based console of the virtual computing service. In many cases, clients may wish to use the compute instances to run applications that require identity validation—that is, in order to obtain permissions for the compute instance to perform various tasks of an application, or to request work operations from other services, the identity of the instance may have to be verified. As the frequency and sophistication with which intruders attack various networks and services increases, clients of virtualized computing services may become reluctant to utilize compute instances or other resources that do not provide support for highly secure mechanisms for resource identity verification.

Figure 1:
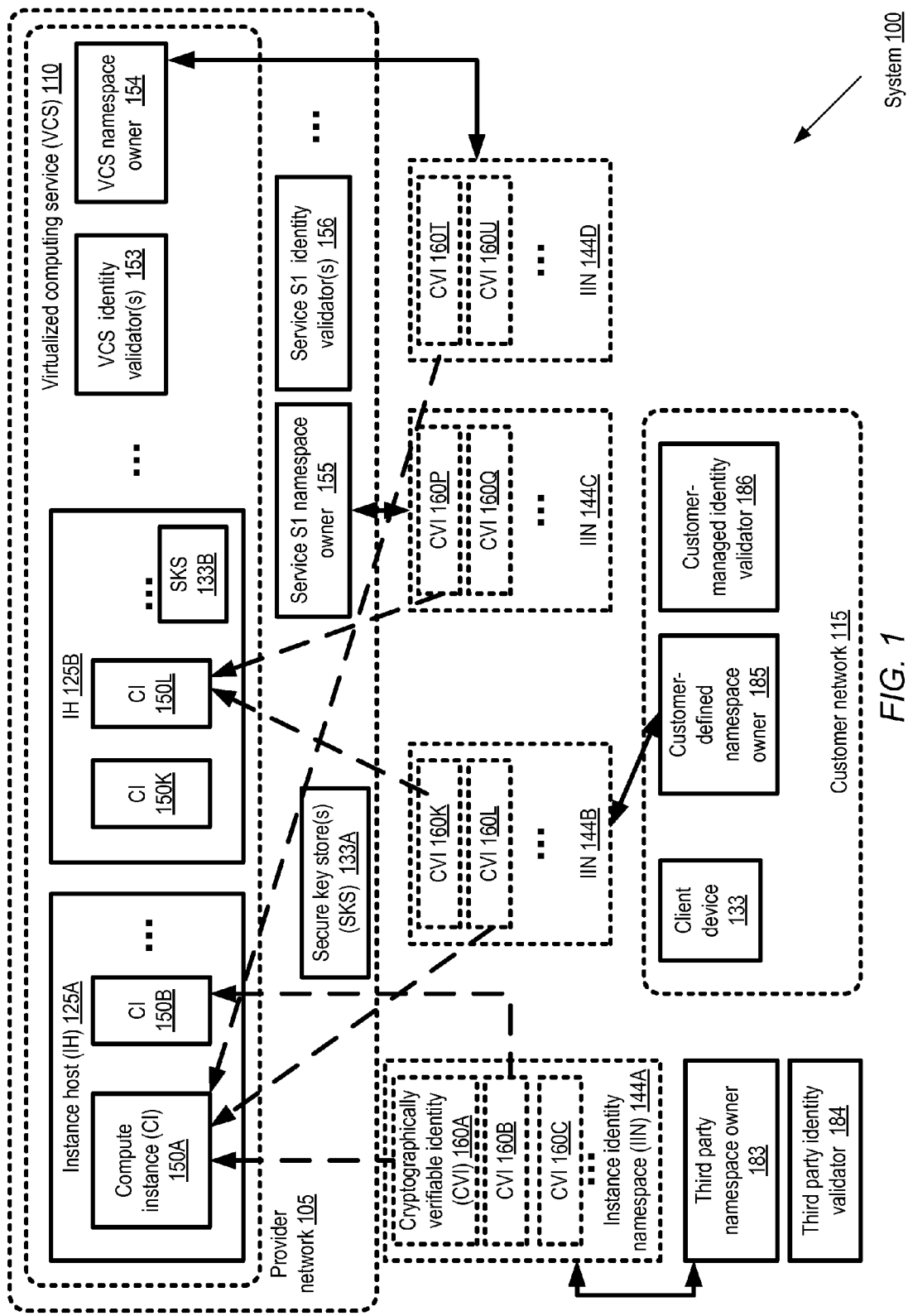
FIG. 1 illustrates an example system environment in which a compute instance implemented at a virtual computing service may be assigned several different cryptographically-verifiable identities (CVIs) within respective namespaces, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for assigning, managing, and using multiple cryptographically verifiable identities (CVIs) within respective namespaces to compute instances at provider networks are described. The assignment of multiple identities to a given compute instance, each of which can be independently validated and used for respective applications or sets of applications, may also be referred to herein as multi-faceted identity assignment. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different compute instances (guest virtual machines) on behalf of respective clients at a given hardware server, without necessarily informing any of the clients that the hardware server is being shared with other clients. Compute instances may be referred to simply as "instances" herein, and the hardware servers on which one or more compute instances are executed may be referred to as "instance hosts" or "virtualization hosts". A provider network may support single-tenant services in some embodiments, either in addition to, or instead of, multi-tenant services, and a resource such as an instance host may be used in single-tenant mode or multi-tenant mode during a given time period. A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

In accordance with accepted virtualization approaches, details about the instance hosts (such as the absolute performance capabilities of processors or cores being used, or the specific data centers at which the hosts are physically located) as well as the mappings between compute instances and instance hosts (e.g., how many compute instances are run at a given host, or the identity of the clients whose instances share a host), may at least in some cases be unavailable to the clients on whose behalf the compute instances are run. At each instance host, the VCS may typically deploy a virtualization management software stack with one or more virtualization management components, such as a hypervisor, an administrative operating system domain, and the like, which may also be inaccessible to the clients for obvious security reasons. In some embodiments, different types or categories of compute instances (e.g., "small", "medium" or "large" instances corresponding to one or more operating systems) may be defined by the computing service, with some indication of the relative capabilities of each instance type and the corresponding pricing policies being made available to potential clients. Given the instance type definitions, in one embodiment clients may be able to select how many instance of each type they wish to acquire within some hierarchical sub-unit of the provider network such as a loosely geographically-defined "region".

Some clients of the provider network may demand higher levels of security and/or identity validation for at least some of their applications than others. (It is noted that the term application, as used herein, may refer to any type of executable program component or combination of components, which may run in user mode, kernel/system mode, or a combination of user and kernel/system modes.) In particular, in view of the fact that it may be possible for many different VCS clients to use a given hardware server, clients may wish to obtain some level of assurance that a given compute instance with which an external entity (such as a server implementing a different service) is to interact truly is the compute instance it claims to be. In some embodiments, it may be possible for VCS users to provide such assurances manually (e.g., via interactions with an administrative console implemented by the VCS), but such manual approaches are notoriously error-prone and may also be susceptible to intruders.

In at least some embodiments, a mechanism to provide non-transferable cryptographic-strength keys usable for various types of security-related operations performed at or by compute instances may be implemented at a virtual computing service. According to such a mechanism, a private key of a cryptographic-strength key pair to be used for identity verification operations associated with a given compute instance may be stored and/or managed at a secure key store, such that the private key itself cannot be copied or examined by the compute instance for which the key pair is to be used (or by any other compute instance). Programmatic interfaces enabling the use of the private key (e.g., to generate or obtain identity-related cryptographic artifacts such as a digital signature) by a compute instance, without revealing the private key to the caller or user of the interface, may be implemented by one or more VCS components in at least some embodiments. A virtualization management component such as a hypervisor or administrative domain operating system at an instance host may implement one or more APIs (application programming interfaces) for such operations on non-transferable keys in one embodiment, and a compute instance running at that host may invoke such an API to obtain artifacts or metadata to be used to assert one or more cryptographically verifiable identities assigned to the instance. In some implementations, the secure key store may be located at the instance host—e.g., a trusted platform module (TPM) or similar peripheral device attached via a communication bus such as a Low Pin Count bus or a PCIe (Peripheral Component Interconnect-Express) bus of the instance host may store the private key. In other embodiments, an external secure key store, such as a hardware security module (HSM) that is accessible via a network from the virtualization management component and/or from the compute instance may be used. In at least one embodiment, multiple cryptographic key pairs may be designated for a given compute instance, with the private key of each such key pair being managed by a secure key store as described above; in other embodiments, only a single key pair may be used for a given compute instance. In some implementations in which multiple key pairs are assigned to a given compute instance, the private keys of several of the key pairs may be managed by a given secure key store (e.g., a local TPM at the instance host where the compute instance is launched, or a remote HSM reached via a network); in other implementations, each private key may be managed by a respective secure key store.

Depending on the set of applications for which a given compute instance is to be used, several different identities or names may be assigned within respective namespaces to the instance in at least some embodiments. Each of the identities may be cryptographically verifiable, e.g., with the help of X.509 or other similar digital certificates digitally signed by respective identity validation authorities organized in a chain of trust, or using any appropriate cryptographic algorithm. The public key of a key pair designated for the compute instance may be indicated in such certificates in some embodiments, with the private key being managed and/or stored at a secure key store as described above. Each such identity may be referred to as a cryptographically verifiable identity (CVI) herein. At least in some embodiments, the virtualized computing service may enable a given compute instance to use one or more cryptographic keys (e.g., by granting the appropriate permissions enabling the instance to use the APIs required to use a private key, by generating unique bindings between keys and instances, by configuring the secure key sources, and so on) to generate the artifacts needed to assert its CVI or CVIs. A number of different types of CVIs may be designated or assigned to a given compute instance in at least some embodiments. For example, the VCS may assign a DNS (Domain Name System) name based at least in part on a virtual IP (Internet Protocol) address to the compute instance in one embodiment as one CVI. (Such an IP address may be termed "virtual" herein because it may be transferred programmatically from one compute instance to another by the VCS without, for example, requiring reconfiguration of physical network interface cards.) For example, the VCS may assign the virtual IP address 54.87.134.66 to an instance, and a name such as <VCS-service-name>-54-87-134-66-<geographical-container>-<vcs-domain-name> that is unique within the DNS namespace may be assigned as the CVI. The same compute instance may also be assigned a second CVI, e.g., in a customer-defined namespace. A customer may, for example, wish to identify all the compute instances configured as respective nodes of a particular application cluster using names such as App1-Node0, App1-Node1, App1-Node2 etc. When communicating with other components of the customer's application environment (some of which may be running within the provider network being used for the compute instances, while others may be located in external networks), the second CVI may be used instead of the first. Similarly, a third CVI that identifies the compute instance as a license holder for a particular third-party software service (or for locally-installed software) may be assigned to the compute instance to enable the use of the third-party software service from the instance. In some embodiments, assignment of CVIs within third-party namespaces—e.g., namespaces managed by a business partner of the provider network operator (or of the client)—may also be supported. Thus, in general, a variety of different CVIs within respective namespaces may be assigned to a given compute instance in various embodiments. The namespaces may be referred to as instance identity namespaces (IINs) herein, and each such namespace may have an associated namespace owner/administrator responsible for selecting the specific names to be assigned to different instances, enforcing any uniqueness requirements for their respective namespaces, identifying the authorities responsible for validating identities within their respective namespaces, and so on. Examples of the types of CVIs that may be useful in various contexts are provided in FIG. 2 and discussed below.

According to at least one embodiment, in response to an identity-related query such as an authentication request from a first authenticator associated with a first application, a compute instance to which multiple CVIs have been assigned may provide an indication of a first CVI within a first instance identity namespace associated with the application. The identity-related query may explicitly or implicitly indicate the namespace in some implementations, or the compute instance may be able to infer the namespace based on the kind of API used for the query or the source from which the identity-related query is received. The first CVI may be associated with a cryptographic key pair designated for the first compute instance, where a private key of the pair is managed by a secure key store configured to prevent copying of the private key to locations external to the secure key store as discussed above. Providing information (e.g., one or more certificates, digital signatures, or other cryptographically-generated artifacts) indicative of a CVI may also be referred to herein as "asserting" the CVI. As discussed above, the use of the private key by the instance may be enabled by the virtualized computing service in at least some embodiments; as a result, in such embodiments the participation and/or consent of the VCS may be required for supporting at least some types of CVIs. In some embodiments, in order to determine the information to be provided in response to the identity-related query, the compute instance may invoke one or more programmatic interfaces implemented by a virtualization management component at the instance host at which the instance was launched.

In response to receiving the indication of the first CVI, the first authenticator may check (e.g., by ensuring that a certificate provided by the compute instance is signed by a trusted party, and/or by decrypting and verifying a digital signature provided by the compute instance using the instance's public key) that the claimed identity is valid. In some cases, the authenticator may have to communicate with other entities (e.g., one or more identity validators designated for the namespace) to check that the identity asserted is valid. If the identity is verified successfully, the compute instance may be permitted to perform one or more operations of the first application, and an indication of such a permission may be transmitted to the compute instance. Similarly, in response to a second identity-related query from a different authenticator associated with a different application and a different IIN, the compute instance may provide an indication of a second CVI assigned to it. The second CVI may then be checked by the second authenticator, e.g., using a similar approach as described above for the first CVI but in the context of the second IIN. If the second CVI is found valid, the compute instance may be allowed to perform operations of the second application. Similar interactions may be required for each of the different CVIs assigned to the compute instance; that is, the compute instance may have to assert respective CVIs for each of several different application contexts. In some embodiments, a given CVI may be usable for several different application contexts—e.g., a compute instance may assert the same CVI in response to identity-related requests from two or more authenticators associated with respective applications.

A wide variety of CVIs may be assigned to a compute instance in different embodiments. As mentioned above, one CVI, which may be used in a plurality of different application contexts, may be a DNS name based at least in part on a virtual IP address assigned to the instance. In at least some embodiments, a compute instance of a provider network may be assigned one or more public IP addresses and one or more private IP addresses. The public IP addresses may be advertised to, or made accessible from, external networks such as portions of the public Internet, while private IP addresses may only be accessible within logically isolated portions of the provider network. An instance may be assigned a CVI based on a public IP address, and/or another CVI based on a private IP address in some embodiments. The virtual computing service being used for the instance may define other namespaces, e.g., either for internal administrative purposes or for interactions with other services or external entities. Some namespaces may correspond to data centers or other geographical locations at which the instances are instantiated, availability containers (groups of resources that are designed to have independent failure profiles) to which the instances belong, and so on, and a respective unique name may be assigned to a given compute instance within one or more such namespaces. In some embodiments, CVIs may also be selected by customers from customer-defined namespaces, or requested by a customer for a namespace defined within the provider network. Customers may also request the assignment of particular names from a DNS namespace for their compute instances in some embodiments—e.g., the DNS name www.<customerCompanyName>.com may be requested as a CVI by a client of the VCS for one or more of their compute instances. In one embodiment, third parties such as business partners of the provider network operator or business partners of the customer may be able to select and assign CVIs to various compute instances. In at least one embodiment, a given CVI may be assigned to a plurality of compute instances—e.g., if a number of compute instances are organized as a replication group or a failover group in the context of a particular service or application, such that at least some of the responsibilities of one of the group members is to be taken over by another group member under certain conditions, several group members may be assigned at least one common or shared CVI.

Each namespace may have one or more identity validators assigned to it by its namespace owner in some embodiments. Such identity validators may include, for example, third-party or public certificate authorities (CAs) outside the provider network in some embodiments. Non-public identity validators may be selected by namespace owners for one or more namespaces in some embodiments—e.g., some validation authorities may be implemented within the provider network (for namespaces defined by the VCS or other services implemented at the provider network), and others may be implemented at customer-owned networks for customer-defined namespaces. In at least one embodiment, a namespace owner may designate itself as the identity validator for its namespace—e.g., a separate validator may not be required. An identity validator, whether public, provider-network-owned, or customer-owned, may, for example, sign X.509 or other digital certificates corresponding to CVIs assigned to compute instances within one or more namespaces. In at least one embodiment, a given digital certificate may be used for asserting more than one identity—e.g., an 1:N mapping between digital certificates and CVIs may be used. In other embodiments, respective certificates may be used for each CVI.

At least some of the CVIs that are assigned to a given compute instance may have a corresponding validity period defined, e.g., indicating the start and/or end time for which the CVI is valid for the instance. Different CVIs assigned to a given compute instance may have different validity periods in at least some embodiments.

In one embodiment, one or more control-plane or administrative interfaces implemented by the virtual computing service may be used by clients to request the assignment of identities within specified namespaces to their compute instances. Identity assignment may be requested at the time of the instance launch in some embodiments (e.g., using one or more parameters of an instance launch request submitted via an API). In one embodiment, identity assignments may also or instead be requested for an instance after it has been launched. In some embodiments, clients may also be able to revoke or un-assign one or more CVIs from a specified instance.

Example System Environment

FIG. 1 illustrates an example system environment in which a compute instance implemented at a virtual computing service may be assigned several different cryptographically-verifiable identities (CVIs) within respective namespaces, according to at least some embodiments. As shown, system 100 includes a provider network 105 at which a virtual computing service (VCS) 110 is implemented. The VCS may establish numerous compute instances 150 at a plurality of instance hosts 125 on behalf of various clients. For example, compute instances 150A and 150B have been set up, e.g., as respective guest virtual machines, at instance host 125A, while compute instances 150K and 150L have been established at instance host 125B. At least some of the compute instances 150 may be set up in response to instance launch requests issued from devices outside the provider network, such as client device 133 within a customer network 115.

In the depicted embodiment, a given compute instance 150 may be assigned zero or more cryptographically verifiable identities (CVIs) 160 (e.g., identities that can be verified with the help of a cryptographic strength public-private key pair assigned to the instance) in respective namespaces. Several different types of instance identity namespaces (IINs) 144 may be supported in some embodiments, with respective namespace owners or managers. A namespace owner may be responsible for defining the IIN (e.g., the format for the set of names that can be assigned, or the range of names that can be assigned), selecting a specific name or identity to be assigned to a given compute instance 150, designating a set of one or more identity validators for the namespace, and so on. In the depicted embodiment, IIN 144A is managed by third-party namespace owner 183, IIN 144B is managed by a customer-defined namespace owner 185, IIN 144C is managed by a namespace owner 155 of a service 51 (other than the VCS) implemented at the provider network, while IIN 144D is managed by a VCS namespace owner 154. Each IIN 144 may have its own syntax and format for CVIs, and at least in one embodiment, the validation mechanisms and policies to be used for the identities may differ from one namespace to another. The term "namespace" may be used synonymously with the phrase "instance identity namespace" herein.

Corresponding to each namespace 144, one or more entities may be designated as identity validators in the depicted embodiment. A third party identity validator 184 (such as a public certificate authority or CA) may be responsible for vouching for the authenticity of CVIs of namespace 144A, for example. Some customers may set up their own customer-managed identity validators 186. One or more of the services implemented at the provider network may instantiate identity validators, such as VCS identity validators 153 and service S1's identity validator(s) 156. At least some of the identity validators may digitally sign certificates (such as X.509 certificates, or other similar certificates that are formatted in accordance with public-key infrastructure standards or specifications), which may be provided by compute instances 150 in response to identity-related requests. One or more cryptographic keys may be associated with some of the artifacts that are used for asserting instance identities in some embodiments.

Depending on the specific types of applications which are to be run at a given compute instance, any desired number of CVIs may be assigned to it, e.g., at the request of the client on whose behalf the instance is established. In some cases, a client may provide an indication of the set of identities required for a given instance before the instance is launched; in other cases, new identities in specified namespaces may be assigned after the instance has begun execution. Instance identities may also be revoked upon request from the instance owner in at least some embodiments. VCS control-plane programmatic interfaces, such as one or more APIs, may be provided to allow customers to indicate identity assignment and/or revocation requests in various embodiments. In the example illustrated in FIG. 1, instance 150A has been assigned three CVIs: CVI 160A in namespace 144A, CVI 160L in namespace 144B, and CVI 160T in namespace 144D. Instance 150B has been assigned CVI 160B in namespace 144A. Instance 150L has been assigned CVI 160K of namespace 144B and CVI 160P of namespace 144C. Instance 150K has no CVIs assigned.

The CVIs assigned to a given compute instance may be used in different ways, depending on the specific application for which the instance is requested to identify itself. In at least some embodiments, a given instance such as 150A may receive an authentication request or other similar identity-related query from some other entity, such as an authentication component of an application running at some other instance 150, at a node of a different service such as S1 being implemented at the provider network, or at a device outside the provider network such as client device 133. In some embodiments, the request may explicitly or implicitly (e.g., by virtue of its format or the source from which it is received) indicate the namespace for which an identity is requested. The compute instance at which the identity query is received may then provide evidence of its identity within the appropriate namespace, e.g., using one or more cryptographic artifacts such as a certificate signed by a trusted identity validator or a chain of identity validators. In at least some implementations, an indication of one or more validators may be included in the evidence. In at least some embodiments, depending on the type of identity query received, the evidence provided by the compute instance may include other artifacts than (or in addition to) digital certificates—e.g., policy tokens (encrypted versions of authorization policies obtained using the compute instance's private key) may be provided, a data value included in the identity query may be signed using the compute instance's private key, or other data that can be decrypted using the instance's public key may be provided. If the authentication component that transmitted the identity query or request to the compute instance 150 is able to confirm the instance's identity (e.g., based on a determination that a trusted identity validator has generated the certificate or policy token), an explicit or implicit acknowledgement of identity confirmation may be provided to the compute instance 150. The validated compute instance 150 may then proceed to perform subsequent operations of the application or interaction for which its identity was being verified by the authentication component.

In at least one embodiment, for example in order to ensure that a given CVI associated with a cryptographic key (e.g., a private key of a public-private key pair) designated for exclusive use of a particular compute instance is not transferred or stolen, a secure key store 133 (e.g., 133A or 133B) may be used for the key. Such a secure key store may allow various operations that involve the use of the non-transferable key, e.g., via a set of APIs implemented by virtualization management components at the instance hosts at which the corresponding instance runs, but may not allow the private key to be copied or transferred away from the secure key store. In some embodiments, a local secure key store 133B such as a trusted platform module (TPM) attached to a peripheral communication bus of the instance host may be used. In other embodiments, a remote secure key store 133A, such as a hardware security module (HSM) of a security service implemented at the provider network may be used. Other mechanisms to secure private keys may be used in some embodiments, e.g., instead of HSMs or TPMs. In at least some embodiments, the VCS may enable (e.g., by granting the appropriate permissions for key-related APIs, configuring the TPM or HSM to be used, or by taking other configuration actions) the compute instance to use the cryptographic key (or keys) needed to assert various CVIs.

CVI Examples

Figure 2:
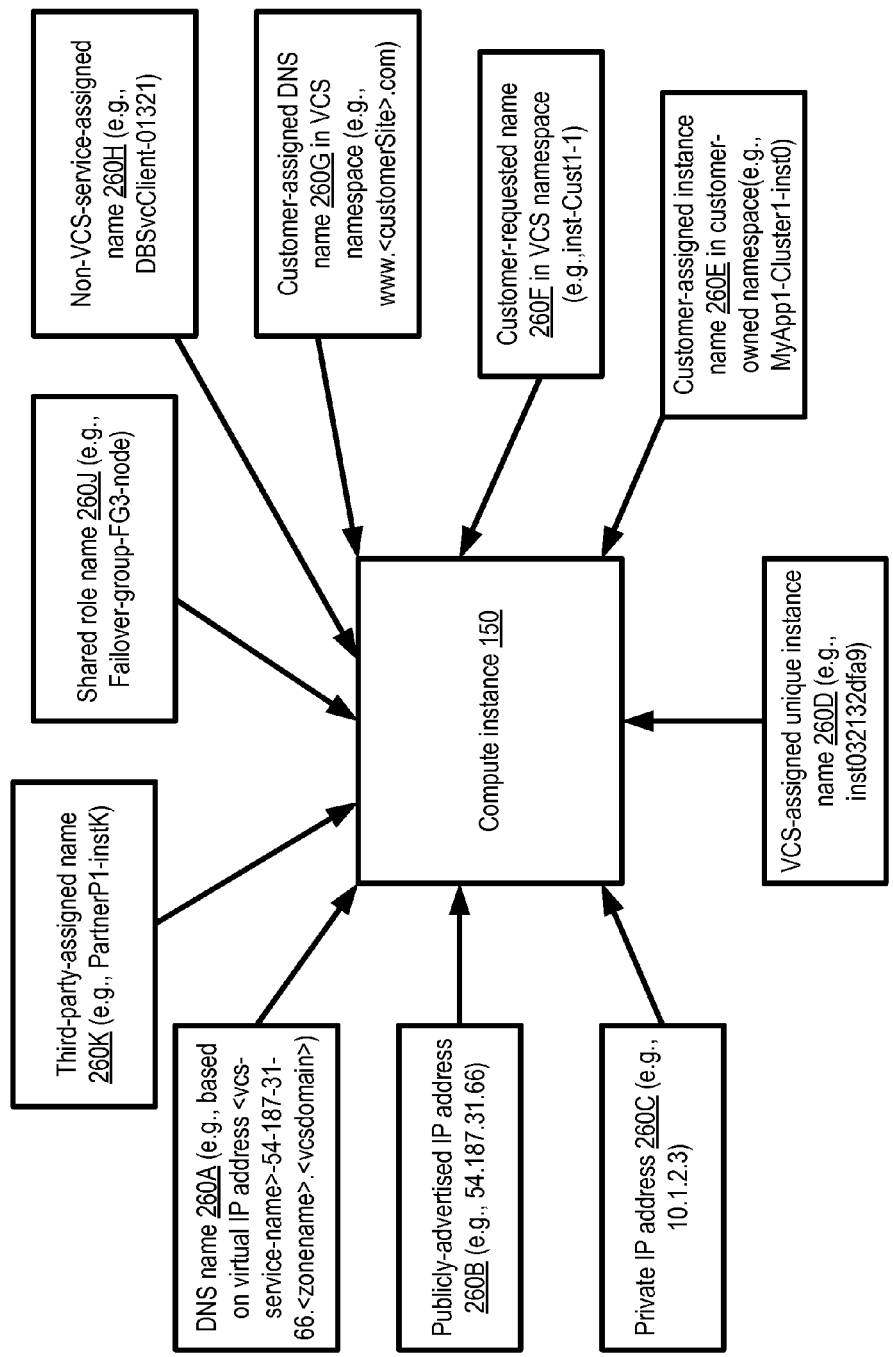
FIG. 2 illustrates examples of the types of identities that may be assigned to a compute instance, according to at least some embodiments.

FIG. 2 illustrates examples of the types of identities that may be assigned to a compute instance, according to at least some embodiments. As shown, compute instance 150 may be assigned a DNS name 260A based on a virtual IP address assigned to it by the VCS. In some embodiments, the format of the DNS name 260A may include respective substrings identifying the VCS service (e.g., <vcs-service-name>), the dot-decimal-notation elements of the IP address (e.g., the string "54-187-31-66" corresponding to the IPv4 address 54.187.31.66), some indication of a geographical location of the instance (e.g., <zone>) and a domain name assigned to the VCS. In other embodiments, one or more of the substrings shown in the DNS name 260A may not be used.

In at least some embodiments, one or more public IP addresses and one or more private IP addresses may be assigned to a given compute instance at a given point in time, and such IP addresses may be used for CVIs of the compute instance. A public IP address may be defined as one that can be accessed from portions of the public Internet, e.g., as a result of being advertised via a protocol such as BGP (Border Gateway Protocol). In contrast, a private IP address may be accessible only within a subset of the provider network, e.g., from within one or more isolated virtual networks (IVNs) of the provider network. IVNs may also be referred to as virtual private clouds or VPCs in some environments. An IVN may comprise a collection of computing and/or other resources in a logically isolated section of the provider network 105, which may be established at the request of a particular customer of the VCS. The customer may be granted substantial control with respect to networking configuration for the devices included in the IVN. In some embodiments, for example, a customer may select the private IP address ranges to be used for various compute instances 150 of an IVN, manage the creation of subnets within the IVN, and the configuration of routing metadata for the IVN. In some embodiments, compute instances and other resources that are to be used to perform the operations of one or more other services (e.g., a file storage service, or a database service) implemented at the provider network may also be organized in one or more IVNs, and corresponding private IP addresses may be assigned to such resources. Because different IVNs are isolated from each other with respect to private IP addresses used internally, it may sometimes be the case that a given private IP address may be assigned to more than one compute instance within respective separate IVNs. In the depicted embodiment, publicly advertised IP address 54.87.131.66 260B may serve as one CVI, while a private IP address 260C such as 10.0.0.1 may serve as another CVI for instance 150.

In addition to the IP address-based names that may be assigned to various compute instances, the VCS may define one or more other namespaces in some embodiments, with instance names that are independent of IP addresses. For example, a given compute instance 150 may, at least at some points of time, be disconnected from an IP network or may be in transition between one network address and another, and the VCS may assign a name (such as a unique string beginning with "inst") that can be used to refer to the instance independently of its networking status. Such a VCS-assigned unique instance name 260D may be considered another example of a CVI assigned to an instance 150. Similarly, other services of the provider network may assign their own names to compute instances being used by, or interacting with, the services in some embodiments. Such a non-VCS-service-assigned name 260H, such as DbSvcClient-01321 (indicating that the compute instance is a client of a database service called DbSvc) may represent another example of a CVI.

Customer-selected or customer-requested identities may also be assigned to compute instances in various embodiments. Three different types of customer-influenced identities are indicated in FIG. 2, corresponding to respective types of namespaces. A customer may define their own namespace for instances, e.g., to be validated and used primarily within a customer network or in interactions with other instances owned by the same customer. A customer-assigned name 260E may be selected and assigned as a CVI of compute instance 150 in such a namespace, such as "MyApp-Cluster1-inst0". Customers may also request specific names to be assigned to an instance 150 within a VCS-owned namespace (as in the case of customer-requested name 260F), and/or within a DNS namespace (as in the case of customer-assigned DNS name 260G) in some embodiments. In some embodiments, a third party entity (i.e., an entity other than the provider network operator, and other than the customer) such as a business partner or a participant in a provider network's online marketplace may assign a CVI to an instance. For example, the third-party-assigned name 260K may be selected for an instance within a namespace defined and managed by the third party entity. Such third party CVIs may be assigned by third-party namespace owners at the request of, or with the approval of, the customer and/or the VCS in various embodiments, e.g., to enhance the ability of the instances to utilize products or features implemented by the third party entities. In at least some embodiments, a third party namespace owner may also implement one or more identity validators for their namespaces. In one embodiment, as mentioned above, a shared identity associated with a particular role played by an instance within a group of cooperating instances may be assigned, e.g., so that one member of the group may be enabled to take over at least some of the workload of another member of the group as and when necessary. Shared role name 260J ("Failover-group-FG3-node", indicating that the instance is a member of a failover group) represents an example of such a shared CVI that may be assigned to a plurality of instances. Such peer groups of cooperating instances configured to take over group members' workloads in the event of a failure may be established by a variety of different services of the provider network in some embodiments (including the VCS, various storage-related services, high-performance computing services, and so on).

It is noted that the assignment of a given identity to a given instance may be temporary in at least some embodiments, and re-use of a previously used identity may be permitted in at least one embodiment. For example, an instance may be assigned a particular CVI "CVI1" in a given namespace NS1 between times T1 and T2, no CVI within NS1 during the time interval T2 to T3, a different CVI "CVI2" in NS1 between times T3 and T4, and the previously-assigned CVI "CVI1" between times T4 and T5.

Interactions with Application-pecific Authenticators

Figure 3:
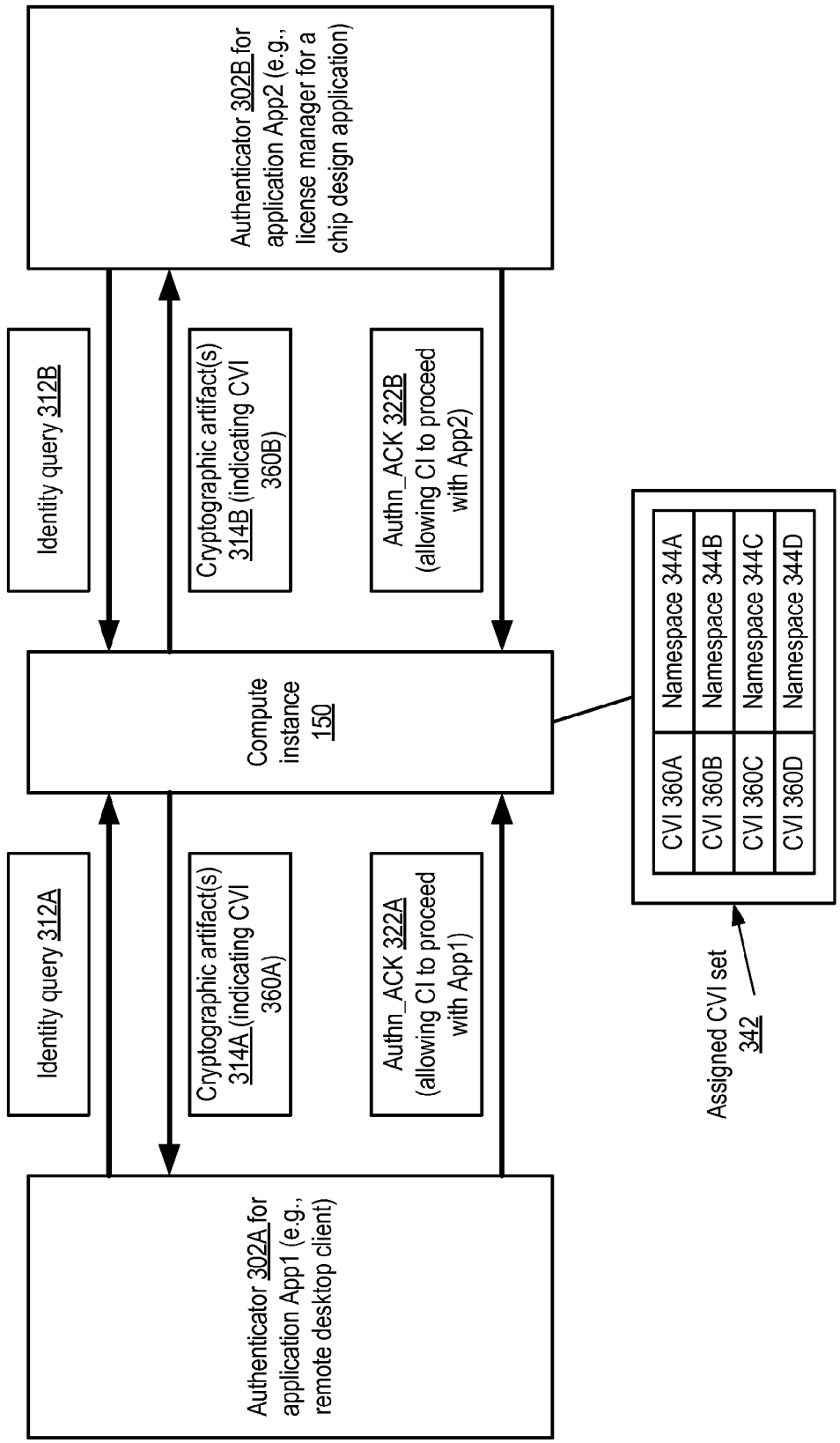
FIG. 3 illustrates examples of interactions between authentication components of multiple applications and a compute instance, according to at least some embodiments.

FIG. 3 illustrates examples of interactions between authentication components of multiple applications and a compute instance, according to at least some embodiments. Different CVIs 360A-360D (corresponding to respective namespaces 344A-344D) of a CVI set 342 assigned to a given compute instance 150 may enable the instance to respond to specific authentication challenges corresponding to each of several different applications in the depicted embodiment, enabling the instance to receive permissions to proceed with operations of those different applications. Authenticators 302A and 302B of two different applications App1 and App2 are shown in FIG. 3. For example, authenticator 302A may be a remote desktop client application, while authenticator 302B may be a license manager of a chip design application implemented using software-as-a-service. The implementer of the remote desktop client application may wish to ensure that, before establishing a remote desktop session to a compute instance, the identity of the compute instance is verified. Similarly, the implementer of the chip design application may wish to ensure that before the CAD tool can be invoked or used from the compute instance, the identity of the compute instance is verified to ensure that the use of the CAD tool from the instance is permitted.

Compute instance 150 may be requested to prove its identity by each of the authenticators in separate identity queries 312A and 312B in the embodiment shown in FIG. 3. The identity queries 312A and 312B may be received at different points in the lifetime of the compute instance. In response to identity query 312A, compute instance 150 may determine the particular namespace 344A pertaining to the identity request, and provide one or more cryptographic artifacts 314A indicating a CVI 360A assigned to the instance within that namespace 344A. Similarly, one or more cryptographic artifacts 314B indicative of CVI 360B in namespace 344B may be provided in response to identity request 312B from authenticator 302B. A number of different types of objects generated at least in part using cryptographic algorithms or cryptographic-strength keys may be used as evidence of an instance's identity in various embodiments. For example, cryptographic artifacts 316 may include digital certificates, an encrypted version of a license agreement, encrypted policy tokens, and so on, at least some of which may be obtained using the public key of a key pair assigned to compute instance 150 in some embodiments. A number of different types of authentication protocols may be used by applications that require instance identity verification in various embodiments, including for example multi-step protocols involving more than one message exchange, and the compute instance 150 may respond appropriately to the different steps required to prove its identity. In some embodiments, at least a portion of the identity information provided in response to an identity query 312 may involve the use of the compute instance's private key, which may be managed at a secure key store that prohibits copying of the key. For example, the compute instance 150 may have to invoke an API implemented by an intermediary such as a virtualization management component, or by a secure key store, enabling the encryption of a data element using the private key. Responses to the identity queries may originate at any of several different layers of the software stack of a compute instance in various embodiments, e.g., such responses may be generated by an application running in user mode, an operating system module, a device driver module, and so on.

After an authenticator 302 has accepted or verified the identity of the compute instance 150 with respect to the relevant namespace 344, in at least some cases an acknowledgement message (such as Authn_ACK message 322A or 322B) may be sent to the compute instance. Such an acknowledgement may serve as a signal to the compute instance that it is permitted to proceed with additional operations associated with the application (e.g., App1 or App2). Explicit authentication acknowledgement messages may not be used by some applications in at least some embodiments. It is noted that in some embodiments, for at least some types of instance identity namespaces, a compute instance may assert a CVI as the first step of an interaction with an authenticator—that is, instance identities need not necessarily be asserted only in response to received requests.

Examples of Secure Key Stores

Figure 4:
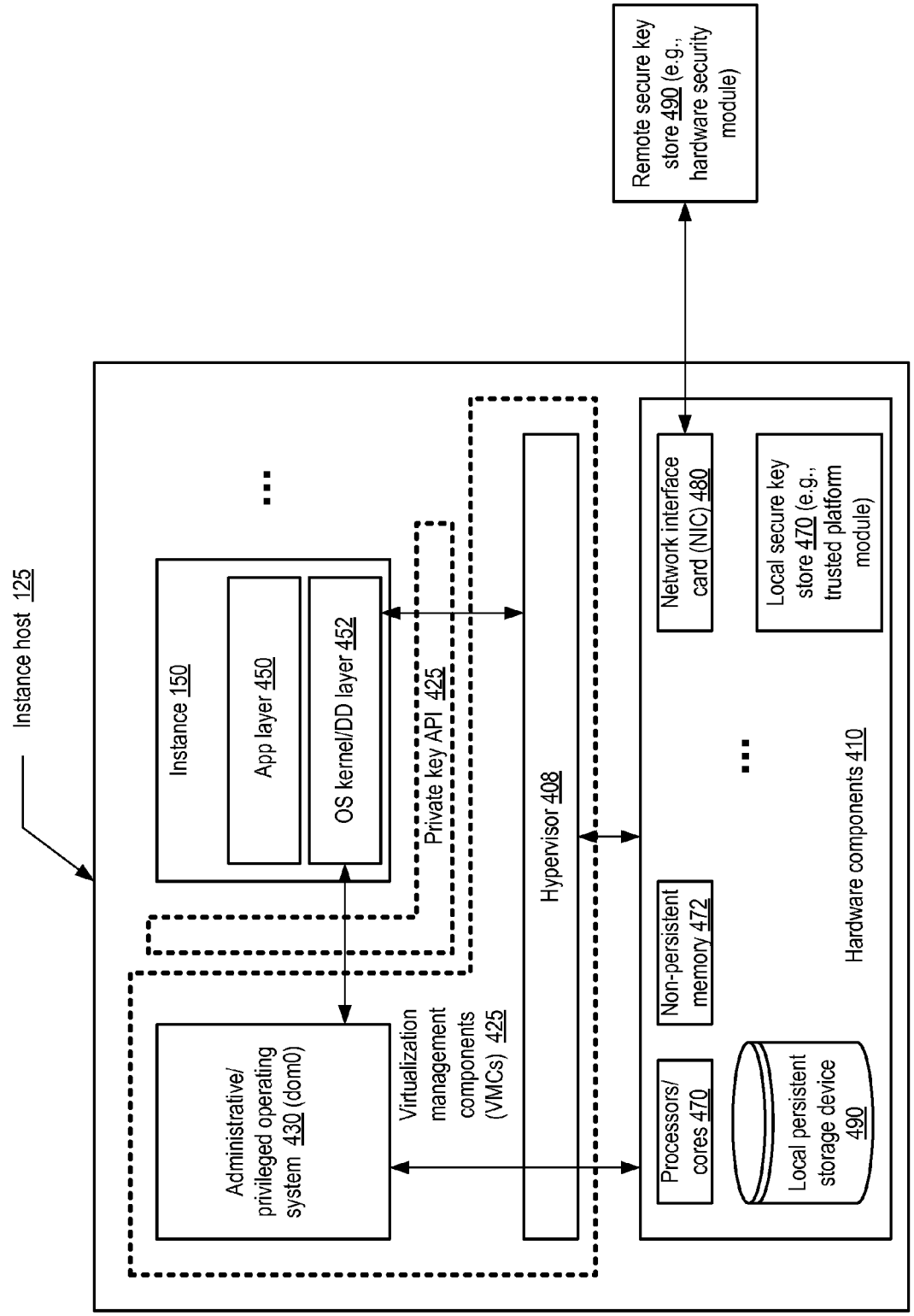
FIG. 4 illustrates an example of an instance host at which a programmatic interface enabling a compute instance to utilize a non-transferable private key managed by a secure key store may be implemented, according to at least some embodiments.

As discussed above, private keys of a key pair assigned to a compute instance may be used for at least some operations performed to assert a compute instance's identity within a given namespace in some embodiments. FIG. 4 illustrates an example of an instance host at which a programmatic interface enabling a compute instance to utilize a non-transferable private key managed by a secure key store may be implemented, according to at least some embodiments. As shown, instance host 125 may comprise a plurality of hardware components 410, which may include, for example, some number of processing cores or processors 470, at least one non-persistent memory 472 which may be referred to as a main memory, one or more local persistent storage devices 490 such as disks (which may include rotating disks and/or solid state disks), and one or more network interface cards (NICs) 480. Other non-persistent memory locations may also be available at the hardware components layer 410 in at least some embodiments, such as various levels of processor cache, registers, and the like. A local secure key store such as a trusted platform module 470 may also be incorporated within or attached to the instance host 125 in the depicted embodiment. Peripherals such as one or more monitors, mice, and the like (not shown in FIG. 4) may also be attached to the instance host in some implementations.

Various hardware layer resources 410 may be virtualized (e.g., presented to several instances 150 booted or launched at the instance host 125 as though each of the instances had exclusive access to the resources) with the help of a virtualization management software stack that comprises a hypervisor 408 and/or an administrative instance of an operating system 430 in the depicted embodiment. The hypervisor and/or the administrative operating system instance may be considered elements of the VCS, and may be referred to as virtualization management components (VMCs) 425. The administrative instance of the operating system may be referred to as a "privileged domain" labeled "domain 0" or "dom0" in some implementations, while respective operating systems established for each of the instances 150 may be referred to as "unprivileged domains" (labeled "domU"), "guest operating systems", or "guest domains".

The hypervisor 408 may typically act as an intermediary between the compute instance and a hardware component of the instance host in the depicted embodiment. In some cases, depending for example on the specific programmatic interfaces being used, both the hypervisor and the administrative operating system instance 430 may be intermediaries between the instance 150 and the hardware. For example, the request path for an operation may flow as follows: compute instance->hypervisor->dom0->hypervisor->hardware, and the response may be provided to the compute instance using the reverse path. In some implementations, dom0 may be able to directly access one or more types of hardware components; other interactions between dom0 and the hardware may pass through the hypervisor. When a hardware component (such as the secure key store 470) is to be utilized from a compute instance 150, e.g., due to an operation requested by the application layer 450, a corresponding request directed to a VMC may be generated by operating system kernel or device driver layer 452. In the depicted embodiment, for example, one or more private key APIs 425 supported by the VCS may be invoked from the compute instance 150 to utilize the private key managed by the secure key store. The APIs 425 may enable the use of the private key, e.g., for generating a cryptographic artifact, without allowing the caller (e.g., the compute instance) to copy or transfer the private key in the depicted embodiment.

In the depicted embodiment, instead of or in addition to the use of a local secure key store 470, a remote secure key store 490 (such as a hardware security module (HSM) of a security service implemented at the provider network) may be used. The remote secure key store may also be utilized in at least some embodiments using similar kinds of APIs 425 that prevent the copying of private keys as described above. Interactions with the remote secure key store 490 may have to pass through the hardware NIC 480. In one embodiment, only one type of secure key store—e.g., either local key stores 470, or remote key stores 490—may be used. In at least one embodiment, multiple key pairs may be designated for a given compute instance (e.g., for respective CVIs in different namespaces), and different secure key stores may be used for the private keys of the multiple key pairs. In other embodiments, the same pair of keys may be used for several different CVIs in respective namespaces. The key pairs may be compatible with any of various appropriate encryption standards and/or algorithms in different embodiments, such as a version of the Advanced Encryption Standard (AES), the RSA (Rivest-Shamir-Adleman) algorithm, DES (Data Encryption Standard), PGP (Pretty Good Privacy), or the like.

Administrative Interactions for Identity Assignment

Figure 5:
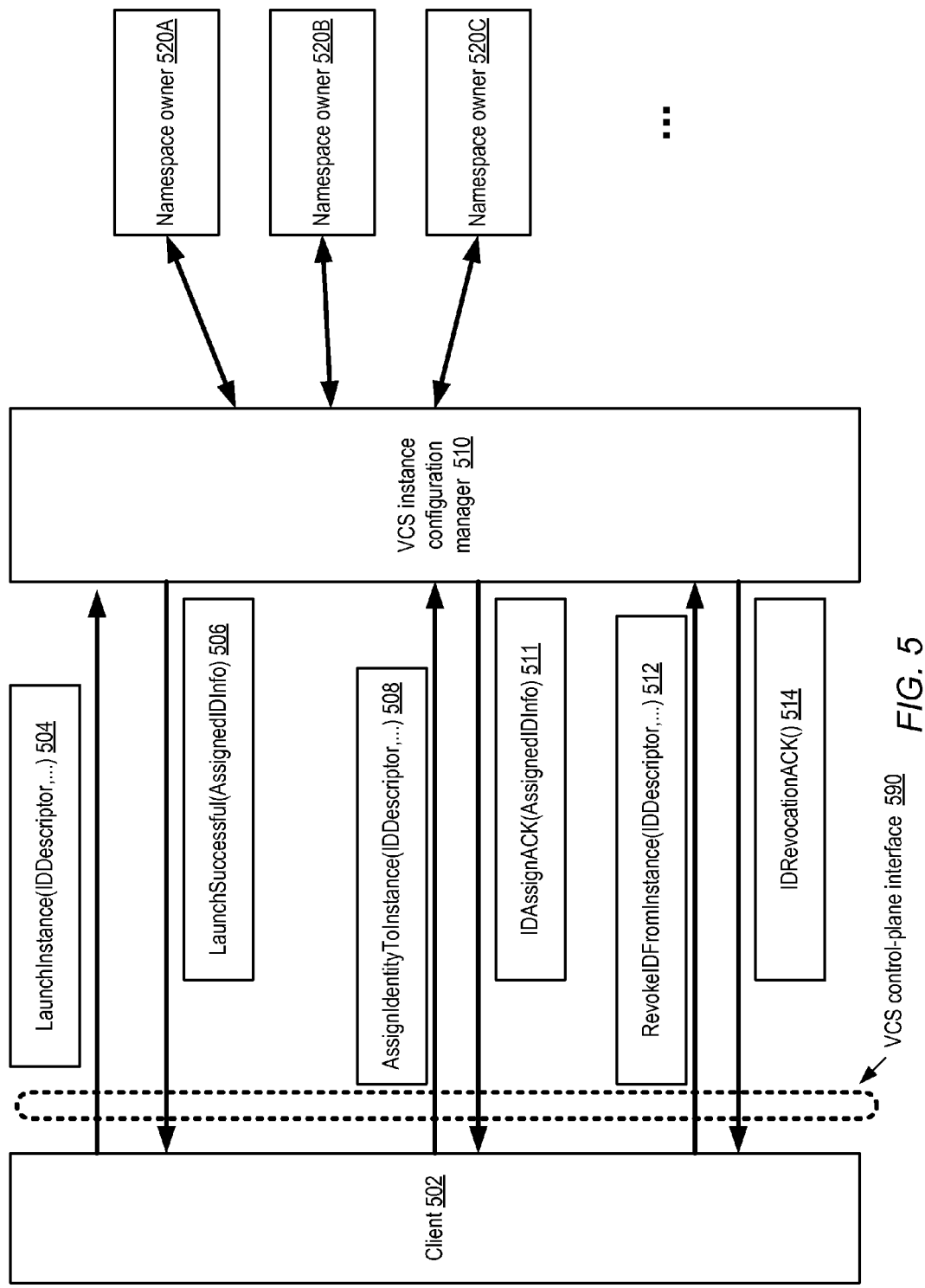
FIG. 5 illustrates examples of identity-related control-plane interactions between a client and an instance configuration manager, according to at least some embodiments.

In some embodiments, a set of programmatic interfaces for configuration operations related to instance identity may be supported. FIG. 5 illustrates examples of identity-related control-plane interactions between a client and an instance configuration manager, according to at least some embodiments. Some clients may determine the types of identities to be assigned to an instance before the instance is launched, while other clients may assign identities to instances subsequent to launch. Clients may also be able to revoke identities from compute instances in the depicted embodiment. For these and other types of configuration operations, a set of programmatic interfaces 590 may be implemented by the VCS control plane in the depicted embodiment.

As shown, a client 502 may submit a LaunchInstance request 504 to an instance configuration manager of the VCS in the depicted embodiment via a programmatic interface 590, with an identity descriptor (IDDescriptor) parameter indicating one or more requested identity types for the instance to be launched. For each requested identity, the identity descriptor may indicate various properties such as an identifier of a namespace, the namespace owner, identity validity period information, and the like, as described below in the context of FIG. 6. A LaunchInstance request (and the other example requests illustrated in FIG. 5) may each include zero or more additional parameters not shown in FIG. 5, as indicated by the ellipses (" . . . "). Clients 502 that do not wish to assign identities to compute instances at or before launch may not include the identity descriptor in their launch requests in some embodiments; that is, the identity descriptor may be an optional parameter.

In response to receiving a LaunchInstance request with an identity descriptor, the instance configuration manager 510 may first verify that the requesting client is permitted to assign the identities in the depicted embodiment. Not all clients may be granted permission to assign identities within various types of namespaces in at least some embodiments; for example, only a selected set of instance types (e.g., "large" instances, which may cost more than "small" instances) may be permitted to have multiple CVIs, and clients that issue a request to assign multiple identities to an instance for which only a single CVI (or no CVI at all) is permitted may receive a "permission denied" or similar error message. In at least one embodiment, clients that wish to assign more than one CVI to an instance may be required to accept a pricing policy that includes per-identity prices. In some embodiments, the type of identity validation required for a given CVI (e.g., whether a provider network's own identity validators can be used, or whether external identity validators such as public Certificate Authorities are to be used) may determine the pricing associated with identity assignment. If the client's LaunchInstance request meets the configuration manager's acceptance criteria, the configuration manager may initiate the assignment of the requested types of identities from the appropriate set of namespace owners 520 in the depicted embodiment, such as namespace owner 520A, 520B or 520C. The requests directed to the namespace owners may include the public key(s) of key pairs to be assigned to the compute instance to be launched in some implementations. The instance configuration manager 510 may receive notifications from the namespace owners indicating that the requested identities have been successfully assigned in some embodiments. A LaunchSuccessful message 506 indicating the identity or identities successfully assigned to the instance (e.g., contained in an AssignedIDInfo parameter) may be provided to the client 502 in the depicted embodiment. In at least some embodiments, one or more CVIs may be assigned by default to an instance, e.g., even if the client on whose behalf the instance is launched does not explicitly indicate any identity-related preferences for the instance.

Post-launch identity assignments for a currently-running instance may be requested by client 502 via an AssignIdentityToInstance request 508 in the depicted embodiment. In response, the configuration manager 510 may once again check that the client is permitted to assign the identities, and then initiate the identity assignment to the running instance in a manner similar to that discussed above with respect to the LaunchInstance request 504. An acknowledgement message IDAssignACK 511 indicating the successful assignment of the requested identities may be provided to the client 502.

In order to revoke an identity, the client 502 may submit a RevokeIDFromInstance request 512 to the configuration manager 510, with an IDDescriptor parameter indicating the set of identities to be revoked. Revocation of an identity may be useful, for example, when a set of permissions are only needed by a compute instance for some portion of the instance's lifetime—e.g., when a particular application for which identity verification is needed no longer runs on the instance, the corresponding CVI may be revoked or invalidated. After verifying that the client is permitted to revoke the identity or identities, the configuration manager may initiate the revocation via one or more communications with the appropriate namespace managers 520. If the revocations succeed, an acknowledgement message IDRevocationACK 514 may be transmitted to client 502 in the depicted embodiment. Namespace owners 520 may reject requests to assign or revoke identities for a variety of reasons in various embodiments—e.g., if a requested name has already been assigned. Indications of such rejections may be provided to the requesting clients by the instance configuration manager 510. It is noted that in various embodiments, a variety of different types of programmatic interfaces may be implemented for the kinds of interactions illustrated in FIG. 3 (between authenticators and compute instances) and FIG. 5 (between clients and control-plane components of the provider network). Such interfaces may include APIs, web pages or web-based consoles, graphical user interfaces (GUIs), command-line tools, and the like.

Identity Descriptor Elements

Figure 6:
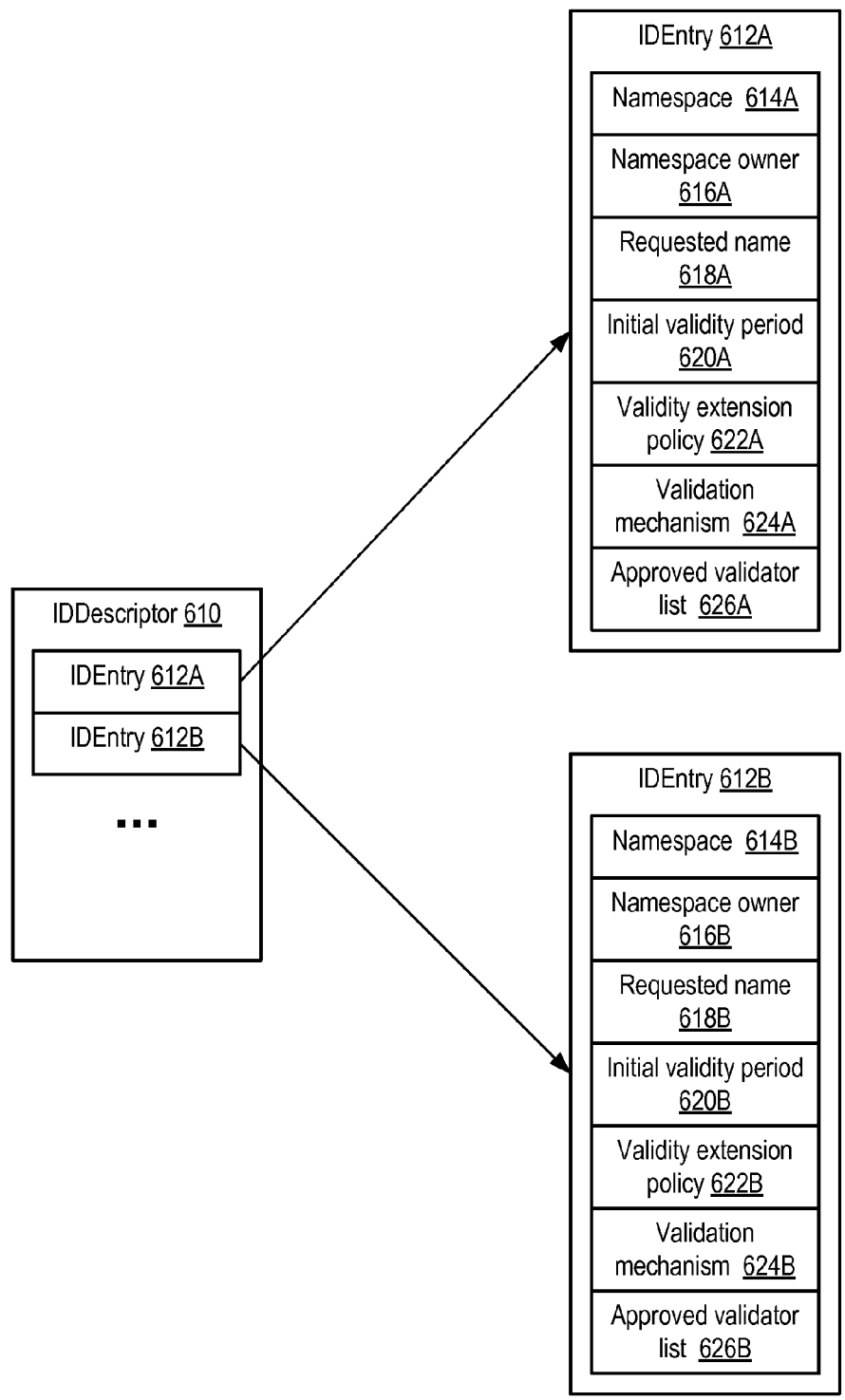
FIG. 6 illustrates example contents of identity descriptors that may be included in identity assignment requests submitted to an instance configuration manager, according to at least some embodiments.

FIG. 6 illustrates example contents of identity descriptors that may be included in identity assignment requests submitted to an instance configuration manager, according to at least some embodiments. An identity descriptor 610 comprising a plurality of identity entries 612, such as 612A or 612B, may be provided as a parameter of a LaunchInstance or AssignIdentityToInstance request similar to the requests illustrated in FIG. 5, for example.

In the depicted embodiment, identity entry 612A may comprise some combination of the following sub-entries: an identifier of a namespace 614A, the owner 616A of the namespace, a requested name 618A for the instance, an initial validity period 620A for the identity, a validity extension policy 622A (e.g., what steps are to be taken to extend an assigned identity, and the time period for which an expiring identity can be renewed), a validation mechanism 624A (e.g., the type of certificate or algorithm to be used for cryptographic verification of the identity), and/or an approved validator list 626A. Identity entry 612B may specify, for the same instance, a different combination of properties for a second requested identity: e.g., a second namespace 614B, a namespace owner 616B (which may differ from 616A), a different requested name 618B within namespace 614B, an initial validity period 620B (which may differ from 620A), a validity extension policy 622B (which may differ from policy 622A), a validation mechanism 624B (which may differ from 624A) an approved validator list 626B (which may overlap with the validator list 626A). In at least some embodiments, one or more of the sub-entries may be omitted. For example, for some types of identities, instead of proposing a requested name 618, the client may rely on the VCS (or some other service of the provider network) to determine the appropriate name for an instance. Similarly, for validity-related parameters such as validity periods 620, validity extension policies 622 or validator lists, a client may be able to rely on default settings selected by the namespace owner or by the VCS. In at least some embodiments, the validation mechanism for at least some types of identities may be pre-determined—that is, the client may not be able to change the way that instance identities are to be validated, or modify the set of validators that can be used.

In at least one embodiment, it may be possible for the a given type of instance identity to be verified by several different types of validators—e.g., third-party or public certificate authorities outside the provider network, as well as the provider network's own internal certificate authorities may be able to sign digital certificates for an instance's identity. In some such embodiments, a client may be provided with pricing options that are based at least in part on the kinds of identity validators they prefer to use for their instances. For example, a client may be charged a lower billing rate for an instance whose identity is to be validated by an authority within the provider network than for an instance whose identity is to be validated by a third-party or external authority. In some embodiments, some or all of the identity entry subcomponents illustrated in FIG. 6 may be provided as separate parameters of an API call, and not necessarily incorporated within a single object or data structure such as an identity descriptor.

Methods for Supporting Multi-Faceted Instance Identity

Figure 7:
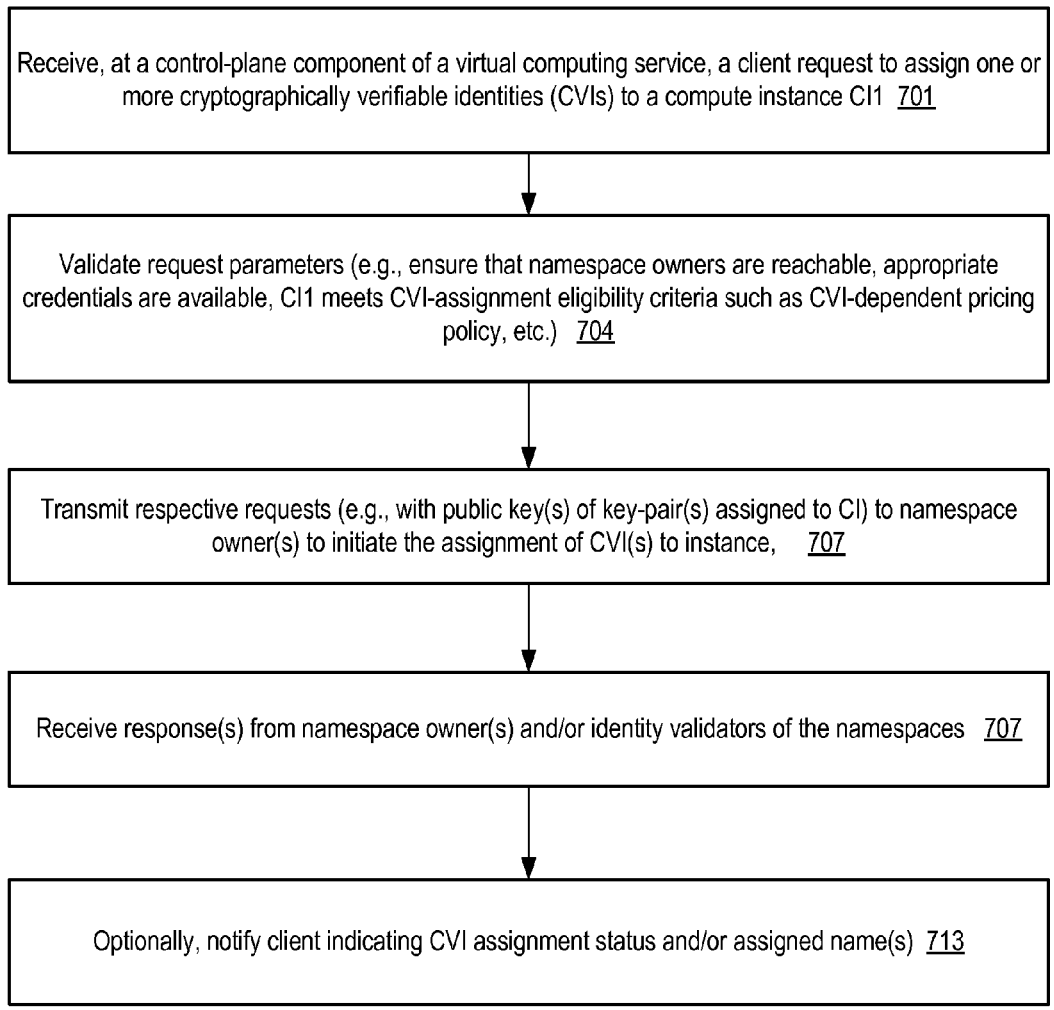
FIG. 7 is a flow diagram illustrating aspects of operations that may be performed to respond to administrative requests pertaining to instance identity assignment, according to at least some embodiments.

FIG. 7 is a flow diagram illustrating aspects of operations that may be performed to respond to administrative requests pertaining to instance identity assignment, according to at least some embodiments. As shown in element 701, a request to assign one or more CVIs to a compute instance CI1 may be received at a control-plane component of a virtual computing service. The term "control-plane components" may be used herein to refer to entities (such as the configuration manager shown in FIG. 510) that are responsible for the configuration and administration of compute instances and instance hosts of the VCS, as opposed to "data plane components" which are involved in implementing non-administrative application operations. The identity assignment request may indicate some or all of the identity properties discussed in the context of FIG. 6 corresponding to each type of identity requested, such as a namespace identifier, a namespace owner, a requested name, and so on. Some parameters may be the same for two or more of the requested identities—e.g., the same validity periods may be requested for two or more different identities, or the same entity may own the namespaces for two or more identities. In some embodiments, default settings may be used for one or more properties that are not explicitly detailed in the client's request. Identity assignment requests may be received prior to the launch of the instance (e.g., in a LaunchInstance request or the equivalent), or after an instance has been launched in other cases.

The control-plane component may validate the contents of the received identity assignment request (element 704). A number of different types of validation operations may be performed in various embodiments, such as checking whether the requested identity has already been assigned (or a different identity within the same namespace has already been assigned), whether the requester is permitted to assign the types of identities requested, whether the specified namespace owners are reachable from the VCS, or whether the particular instance CI1 meets the eligibility criteria for CVI assignment. In at least one embodiment, for example, several different types of compute instances (such as "small", "medium", and "large" instances) may be supported by the VCS, with respective pricing policies, and CVIs within a given type of namespace may not necessarily be assignable to all instance types. In at least one embodiment, different types of CVIs may have different pricing policies associated with them, e.g., based on the namespace and identity validators for the CVI type. In such an embodiment, the control-plane component may have to ensure that the appropriate pricing policy is in effect for CI1, or that the requesting client has agreed to the appropriate pricing policy, before approving the assignment of one or more CVIs. In some implementations, e.g., in an implementation in which not all instances are permitted to use cryptographic keys managed by secure key stores, the VCS control-plane component may verify that the instance to which the CVI is to be assigned is enabled to utilize the appropriate set of keys to assert the CVI.

After the identity assignment request is validated, the control-plane component may transmit respective requests to the namespace owners for each of the requested identities (element 707). In at least one embodiment, the control-plane component may be able to determine the public key of a cryptographic key pair to be used for a given identity, and the public key may be included in the requests sent to the namespace owners. Some or all of the parameters included in the client's identity assignment request may be passed on to the namespace owners in one embodiment. The namespace owners may perform their own validation operations in response to the request from the control-plane component. If the validation operations succeed, the namespace owners and/or the identity validators of the respective namespaces may generate the metadata necessary for the requested identity (e.g., the name to be assigned, the appropriate digital certificates or other identity-related artifacts, and so on).

The control-plane component may receive acknowledgements from the namespace owner(s) (element 710), indicating that the requested types of identities have been assigned to the compute instance CI1. The names assigned to CI1 within one or more of the namespaces may be provided to the control-plane component in at least some embodiments. In some embodiments, an identity validator for a namespace may also or instead notify the control-plane component that an identity within the namespace has been successfully assigned to CI1. In the depicted embodiment, the control-plane component may notify the client regarding the status of CI1's identities, e.g., that the requested identities have been assigned or if one or more of the requested identities were not assigned (element 713). The names assigned to the instance in the various namespaces may also be provided to the client in some embodiments. In at least one embodiment, the VCS may implement a control-plane programmatic interface (e.g., via an API such as "DescribeInstance" or a console) enabling a client to obtain a list of all the CVIs assigned to a given compute instance, together with the identity properties such as namespace identifiers, namespace owners, validity periods, validator lists, and so on.

Figure 8:
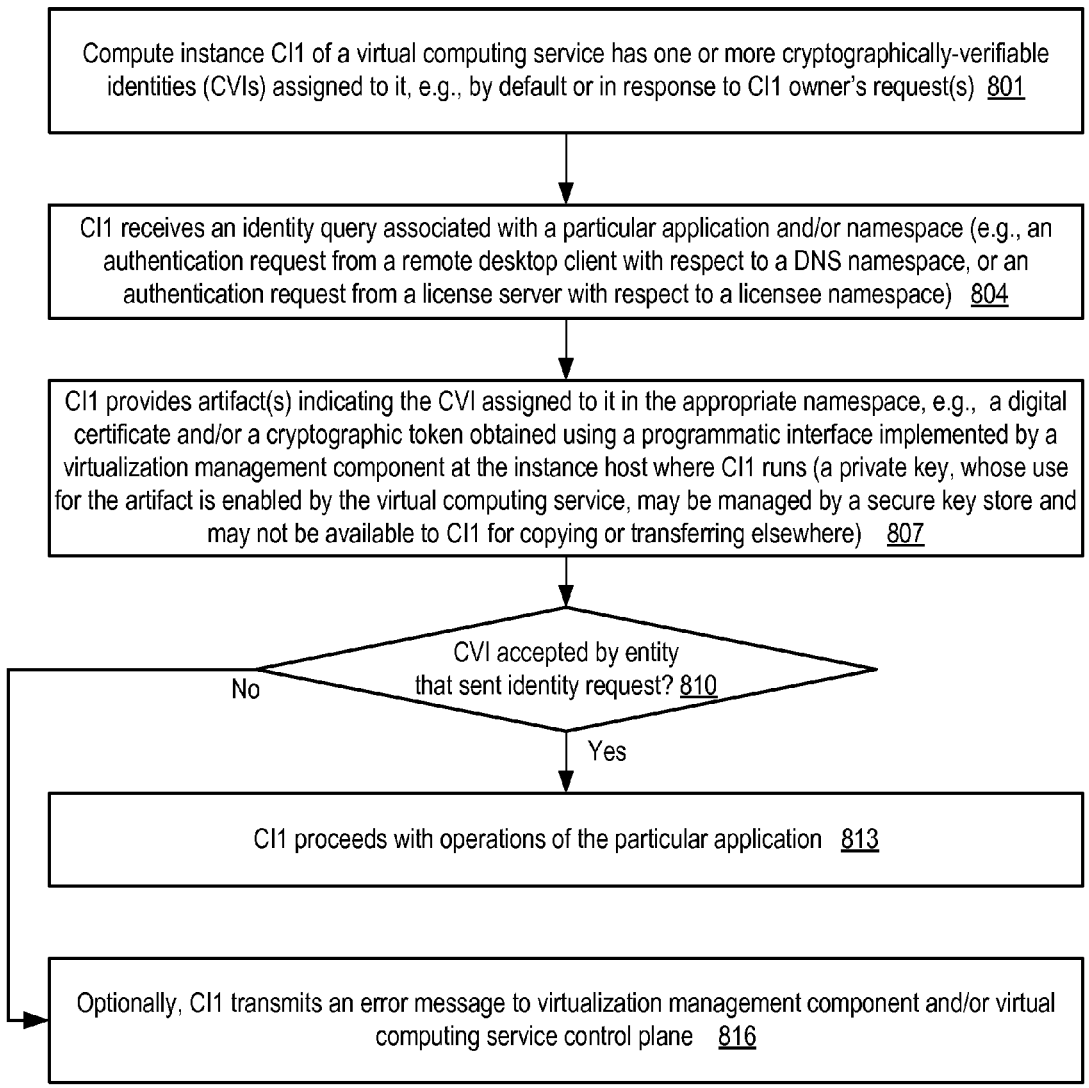
FIG. 8 is a flow diagram illustrating aspects of operations that may be performed at a compute instance to which one or more identities within respective namespaces have been assigned, according to at least some embodiments.

FIG. 8 is a flow diagram illustrating aspects of operations that may be performed at a compute instance to which one or more identities within respective namespaces have been assigned, according to at least some embodiments. As shown in element 801, one or more CVIs may be assigned to a given compute instance CI1 of a virtualized computing service (VCS), e.g., either by default based on VCS policies in effect for the instance category to which CI1 belongs, or in response to the instance owner's request(s).

CI1 may receive an identity query associated with a particular application and/or namespace (e.g., a query from a remote desktop client with respect to a DNS namespace, or a query from a license server with respect to a licensee namespace) (element 804). Some such identity queries may also be referred to as authentication challenges. In response, CI1 may provide one or more cryptographically-generated artifacts as an indication of the CVI assigned to it in the appropriate namespace (element 807). In some cases, CI1 may have to first determine the namespace that is applicable to the particular application in whose context the identity was received; in other cases, the identity query or challenge may explicitly indicate the namespace. In one embodiment, an indication of one or more identity validators (e.g., trusted authorities that can be consulted to verify CI1's claimed identities) may be included in CI1's response. In at least some embodiments, each CVI may be associated with a corresponding cryptographic key pair designated exclusively for CI1. It is noted that more than one CVI may be associated with the same key pair in at least some implementations. In at least one embodiment, the artifacts indicating identity may include a digital certificate (signed by an identity validator for the corresponding namespace and including the public key of the associated key pair) and/or another cryptographic value (such as a digital signature) obtained using a programmatic interface implemented by a virtualization management component at the instance host where CI1 runs. The programmatic interface may allow CI1 to indirectly use the private key to obtain the cryptographic value in some implementations, without revealing the private key itself to CI1. The private key may be managed/ stored at a secure key store in various embodiments, such as a local peripheral device attached to a communication bus of the instance host where CI1 runs, or a remote hardware security module accessible from the virtualization management component over a network. The use of the private key by CI1 for asserting its CVI or CVIs may be enabled by the VCS in the depicted embodiment.

If the CVI is accepted by the entity that generated the identity request (as determined in element 810), CI1 may proceed to perform additional operations of the application for which the identity request was received (element 813) in the depicted embodiment. If the CVI is rejected (as also determined in element 810), CI1 may optionally transmit an error message to the virtualization management component of the instance host and/or to the VCS control plane (element 816).

It is noted that in various embodiments, operations other than those illustrated in the flow diagrams of FIG. 7 and FIG. 8 may be used to implement at least some of the techniques for supporting multi-faceted instance identity discussed herein. Some of the operations shown may not be implemented in some embodiments, may be implemented in a different order than illustrated in FIG. 7 or FIG. 8, or in parallel rather than sequentially.

Use Cases

The techniques described above, of providing support for assigning multiple cryptographically verifiable identities to compute instances, may be used in a variety of environments. Many modern applications and protocols that deal with sensitive business data and therefore require high levels of security are now being run in provider network environments. At least some clients of virtual computing services may wish to use their compute instances in multiple application contexts, with each application context imposing its own authentication and security requirements within one or more namespaces. By assigning cryptographic key pairs (whose private keys cannot be modified or copied from their hardware key stores) to each instance, and using the keys to enable the instances to assert their own identities within one or more namespaces, clients may be able to achieve the desired levels of security for many types of applications. Such techniques may also reduce the administrative effort associated with managing compute instances—for example, an administrator may no longer manually (e.g., via an administrative console of the computing service) have to verify that each instance participating in a given application is entitled to do so. Different validation periods and other properties may be set for the different identities assigned to a given instance, enabling greater flexibility than would have been possible if only a single identity were assignable to the instance. Clients may be able to make pricing tradeoffs with respect to instance identity, choosing pricing plans that depend partly on the types of identity validation mechanism to be used for various instances.

Illustrative Computer System

Figure 9:
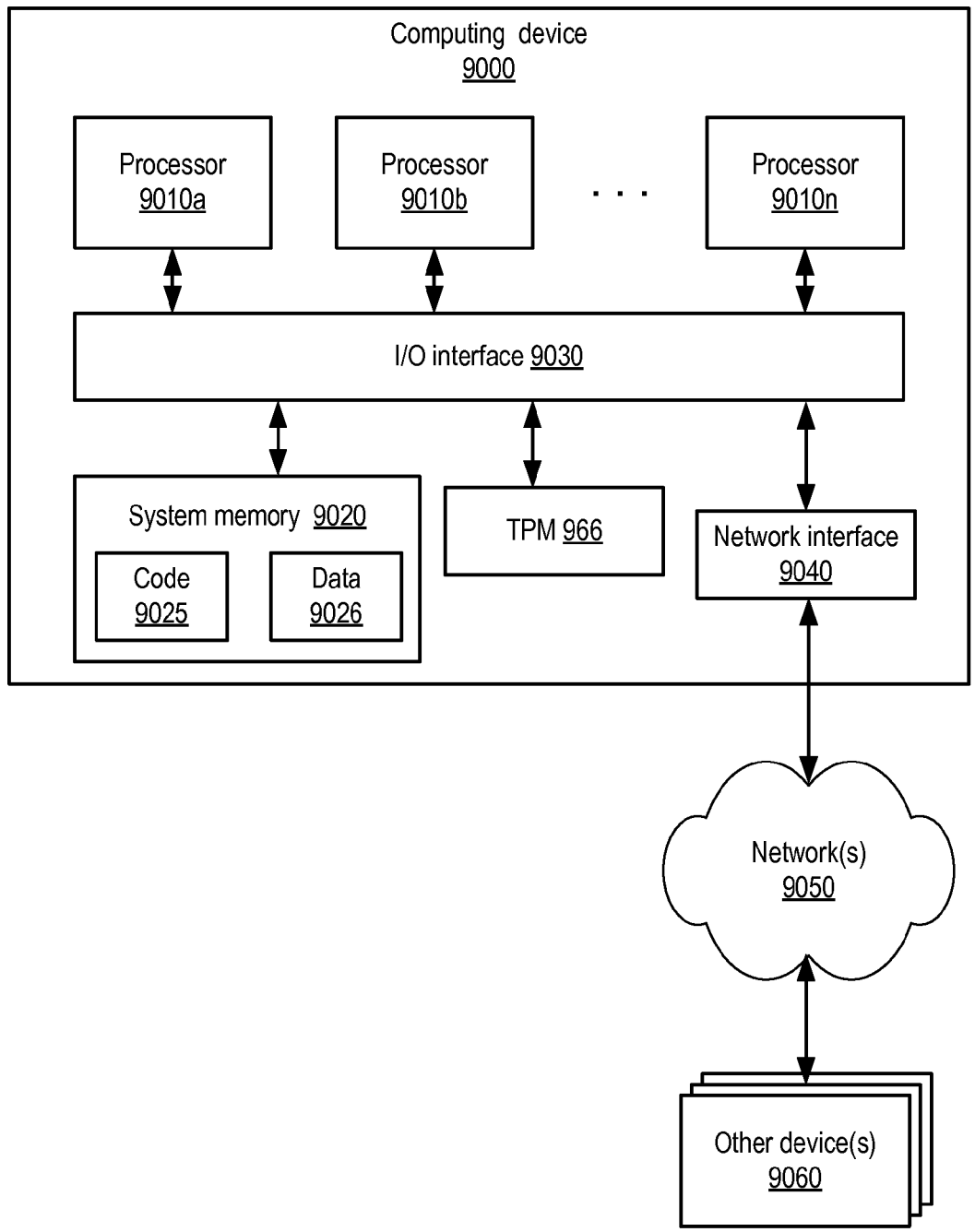
FIG. 9 is a block diagram illustrating an example computing device that may be used in at least some embodiments.

In at least some embodiments, a server that implements one or more of the techniques described above for the assignment of multiple identities within respective namespaces to compute instances may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including a local secure key store such as a trusted platform module (TPM) 966, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of instance hosts of a virtual computing service of a provider network, including at least a first instance host comprising one or more compute instances;
wherein a particular compute instance of the one or more compute instances is configured to:
in response to a first identity query from a first authenticator associated with a first application, provide an indication of a first cryptographically verifiable identity (CVI) assigned to the particular compute instance within a first instance identity namespace (IIN), wherein the first CVI is associated with a cryptographic key pair designated for the first compute instance, wherein a private key of the cryptographic key pair is managed by a secure key store configured to prevent copying of the private key to locations external to the secure key store, and wherein the virtual computing service enables the particular compute instance to use the private key to provide the indication of the first CVI;
in response to a determination that the first CVI has been accepted by the first authenticator, perform one or more operations of the first application;
in response to a second identity query from a second authenticator associated with a second application, provide an indication of a different CVI assigned to the first compute instance within a different IIN; and
in response to a determination that the second CVI has been accepted by the second authenticator, perform one or more operations of the second application.

2. The system as recited in claim 1, wherein the indication of the first CVI includes a first certificate formatted in accordance with a public key infrastructure (PKI) standard.

3. The system as recited in claim 1, wherein the particular compute instance is further configured to:
invoke a programmatic interface implemented by a virtualization management component of the first instance host to obtain at least one artifact included in the indication of the first CVI.

4. The system as recited in claim 1, wherein the secure key store comprises one of: (a) a hardware security module of a security service of a provider network, or (b) a peripheral device attached to a communication bus of the first instance host.

5. The system as recited in claim 1, wherein the first CVI comprises one or more of: (a) a DNS (Domain Name System) name of the particular compute instance based at least in part on a virtual IP (Internet Protocol) address assigned to the particular compute instance, (b) a public IP address assigned to the particular compute instance, (c) a private IP address assigned to the particular compute instance, (d) a unique name assigned to the particular compute instance by the virtual computing service (VCS) of the provider network from a VCS-defined namespace, (e) a unique name selected from a customer-defined namespace by a customer of the provider network, (f) a name selected from a VCS-defined namespace by a customer of the provider network, (g) a DNS name selected by a customer of the provider network, or (h) a name assigned to the particular compute instance within a namespace defined by a third party.

6. A method, comprising:
   launching, at an instance host of a virtual computing service at a provider network, one or more compute instances;
   receiving, at a first compute instance of the one or more compute instances, a first identity query;
   providing, from the first compute instance in response to the first identity query, an indication of a first cryptographically verifiable identify (CVI) assigned to the first compute instance within a first instance identity namespace (IIN), wherein the first CVI is associated with a cryptographic key pair, wherein a private key of the cryptographic key pair is managed by a secure key store configured to prevent copying of the private key, and wherein the virtual computing service enables the first compute instance to use the private key to provide the indication of the first CVI;
   receiving, at the first compute instance, a second identity query; and
   providing, from the first compute instance in response to the second identity query, an indication of a different CVI assigned to the first compute instance within a different IIN.

7. The method as recited in claim 6, wherein the indication of the first CVI includes a first certificate formatted in accordance with a public key infrastructure (PKI) standard.

8. The method as recited in claim 6, further comprising:
   invoking, by the first compute instance, a programmatic interface implemented by a virtualization management component of the instance host to obtain at least a portion of an artifact included in the indication of the first CVI.

9. The method as recited in claim 6, wherein the second CVI is associated with a different cryptographic key pair.

10. The method as recited in claim 6, wherein the secure key store comprises one of: (a) a hardware security module of a security service of a provider network, or (b) a peripheral device attached to a communication bus of the instance host.

11. The method as recited in claim 6, wherein the first CVI comprises one or more of: (a) a DNS (Domain Name System) name of the first compute instance based at least in part on a virtual IP (Internet Protocol) address assigned to the first compute instance, (b) a public IP address assigned to the first compute instance, (c) a private IP address assigned to the first compute instance, (d) a unique name assigned to the first compute instance by a virtual computing service (VCS) of the provider network from a VCS-defined namespace, (e) a unique name selected from a customer-defined namespace by a customer of the provider network, (f) a name selected from a VCS-defined namespace by a customer of the provider network, (g) a DNS name selected by a customer of the provider network, or (h) a name assigned to the particular compute instance within a namespace defined by a third party.

12. The method as recited in claim 6, wherein the indication of the first CVI includes an identity validator comprising one or more of: (a) a public certificate authority (CA), (b) a validation authority implemented within the provider network, (c) a validation authority implemented within a customer network owned by a customer of the provider network to whom the first compute instance is assigned, or (d) a third party validation authority.

13. The method as recited in claim 6, further comprising:
   providing, from the first compute instance in response to the first identity query, an indication of a first validity period of the first CVI; and
   providing, from the first compute instance in response to the second identity query, an indication of a second validity period of the second CVI, wherein the second validity period differs from the first validity period.

14. The method as recited in claim 6, further comprising:
   receiving, at a control-plane component of the provider network, an instance configuration request indicating that the first compute instance is to be assigned an identity within the first IIN; and
   initiating, by the control-plane component in response to the instance configuration request, an assignment of an identity to the first compute instance within the first IIN.

15. The method as recited in claim 6, wherein the first identity query is received at the first compute instance from a license manager associated with a first application, and wherein the first CVI is used by the license manager to verify that the first compute instance is licensed to utilize the first application.

16. The method as recited in claim 6, further comprising:
   establishing, by a service manager of a particular service implemented at the provider network, an instance failover group comprising a second compute instance and a third compute instance, wherein in the event of a failure at the second compute instance, an application which was executing at the second compute instance is to be failed over to the third compute instance; and
   initiating, by the service manager, (a) an assignment of a shared CVI to the second compute instance and (b) an assignment of the shared CVI to the third compute instance, wherein the shared CVI is to be used to verify that the application can be executed at the second compute instance and at the third compute instance.

17. A non-transitory computer-accessible storage medium storing program instructions that when executed on one or more processors:
   receive, at a first compute instance of a virtual computing service, a first identity query;
   provide, from the first compute instance in response to the first identity query, an indication of a first cryptographically verifiable identify (CVI) assigned to the first compute instance within a first instance identity namespace (IIN), wherein the first CVI is associated with a cryptographic key pair, wherein a private key of the cryptographic key pair is managed by a secure key store configured to prevent copying of the private key, and wherein the virtual computing service enables the first compute instance to use the private key to provide the indication of the first CVI;
   receive, at the first compute instance, a second identity query; and
   provide, from the first compute instance in response to the second identity query, an indication of a different CVI assigned to the first compute instance within a different IIN.

18. The non-transitory computer-accessible storage medium as recited in claim 17, wherein the indication of the first CVI includes a first certificate formatted in accordance with a public key infrastructure (PKI) standard.

19. The non-transitory computer-accessible storage medium as recited in claim 17, wherein the instructions when executed on the one or more processors:
   invoke, from the first compute instance, a programmatic interface implemented by a virtualization management component of an instance host to obtain at least a portion of data included in the indication of the first CVI.

20. The non-transitory computer-accessible storage medium as recited in claim 17, wherein the first CVI comprises one or more of: (a) a DNS (Domain Name System) name of the first compute instance based at least in part on a virtual IP (Internet Protocol) address assigned to the instance, (b) a public IP address assigned to the first compute instance, (c) a private IP address assigned to the first compute instance, (d) a unique name assigned to the first compute instance by a virtual computing service (VCS) of a provider network from a VCS-defined namespace, (e) a unique name selected from a customer-defined namespace by a customer of a provider network, (f) a name selected from a VCS-defined namespace by a customer of a provider network, (g) a DNS name selected by a customer of a provider network , or (h) a name assigned to the first compute instance within a namespace defined by a third party.

\* \* \* \* \*